United States Patent [19]

Fuwa

[11] 4,010,364
[45] Mar. 1, 1977

[54] OPTICAL SCANNING SYSTEM
[75] Inventor: Jyoichi Fuwa, Tokyo, Japan
[73] Assignee: Ricoh Co., Ltd., Tokyo, Japan
[22] Filed: May 29, 1975
[21] Appl. No.: 582,030
[30] Foreign Application Priority Data
June 1, 1974  Japan ............................. 49-62291
[52] U.S. Cl. ............................... 250/234; 358/200; 358/208; 338/292
[51] Int. Cl.² .......................................... H01J 3/14
[58] Field of Search ........... 178/7.6; 250/234, 235, 250/236; 350/6, 7

[56] References Cited
UNITED STATES PATENTS

| | | | |
|---|---|---|---|
| 3,235,660 | 2/1966 | Treseder et al. | 250/236 |
| 3,273,446 | 9/1966 | Goetz et al. | 178/7.6 |
| 3,325,594 | 6/1967 | Goldhammer et al. | 178/7.6 |
| 3,758,715 | 9/1973 | Buck et al. | 350/7 |
| 3,781,078 | 12/1973 | Wildhaber | 250/236 |
| 3,845,239 | 10/1974 | Granzow et al. | 178/7.6 |
| 3,886,371 | 5/1975 | Lloyd | 250/234 |

*Primary Examiner*—David C. Nelms
*Attorney, Agent, or Firm*—Frank J. Jordan

[57] ABSTRACT

A document to be scanned is placed on a fixed transparent cylindrical platen and a mirror is rotatable about the axis of the platen. A linear or single line cathode ray tube is fixed in position to produce a light beam which is reflected from the mirror onto the document and moves along the surface of the document in a main scan direction. A light receiving unit comprising a fibre optic bundle and a photoelectric generator is arranged parallel to the main scan direction to receive the light beam reflected from the document. Drive means are arranged to rotate the mirror and move the receiving unit so that the light beam is displaced in the subscan direction perpendicular to the main scan direction and the receiving unit is moved in synchronism therewith.

9 Claims, 8 Drawing Figures

OPTICAL SCANNING SYSTEM

The present invention relates to an optical scanning system which is advantageous for facsimile and copying devices and the like.

In the art of facsimile transmission, two types of scanners for scanning an original document are widely used. One type commonly employed in low speed applications includes a rotary drum on which the document is attached. The drum is rotated, and a light source and receiver assembly is moved parallel to the axis of the drum to focus a spot of light onto the document and pick up the reflections of the spot from the document and convert them into electrical signals. Main scanning is accomplished by the rotation of the drum and side or subscanning is accomplished by moving the source and receiver assembly parallel to the axis of the drum. The limitations of this system include the maximum attainable scanning speed. A further limitation is that the document must be in sheet form since a book or the like cannot be conveniently attached to the drum which must be rotated at high speed.

Another scanning system adapted for use at higher scanning speeds is generally known as a flying spot scanner and includes a linear cathode ray tube which is adapted to produce a light beam along a single scan line. A light receiving unit is disposed closely adjacent to the document to receive the reflections of the light beam from the surface of the document. Whereas main scanning is accomplished by the sweep circuit of the cathode ray tube, side scanning is accomplished by moving the document relative to the cathode ray tube and receiving unit in a direction perpendicular to the main scanning direction. The system is also disadvantageous for transmitting reproductions of books or other bulky documents since the document must be attached to a platen which is movable at high speed past the cathode ray tube and receiving unit.

It is therefore an object of the present invention to provide an optical scanning system which may be advantageously incorporated into a facsimile system or the like in which the document to be scanned is placed on a fixed surface.

It is another object of the invention to provide an optical scanning system comprising a linear cathode ray tube, a rotary mirror adapted to reflect the light beam from the tube onto the document being scanned, a light receiver unit movable along the surface of the document and drive means to rotate the mirror and move the receiver unit in synchronism to provide side scanning.

The above and other objects, features and advantages of the present invention will become apparent from the following detailed description taken with the accompanying drawings.

Figure 1:
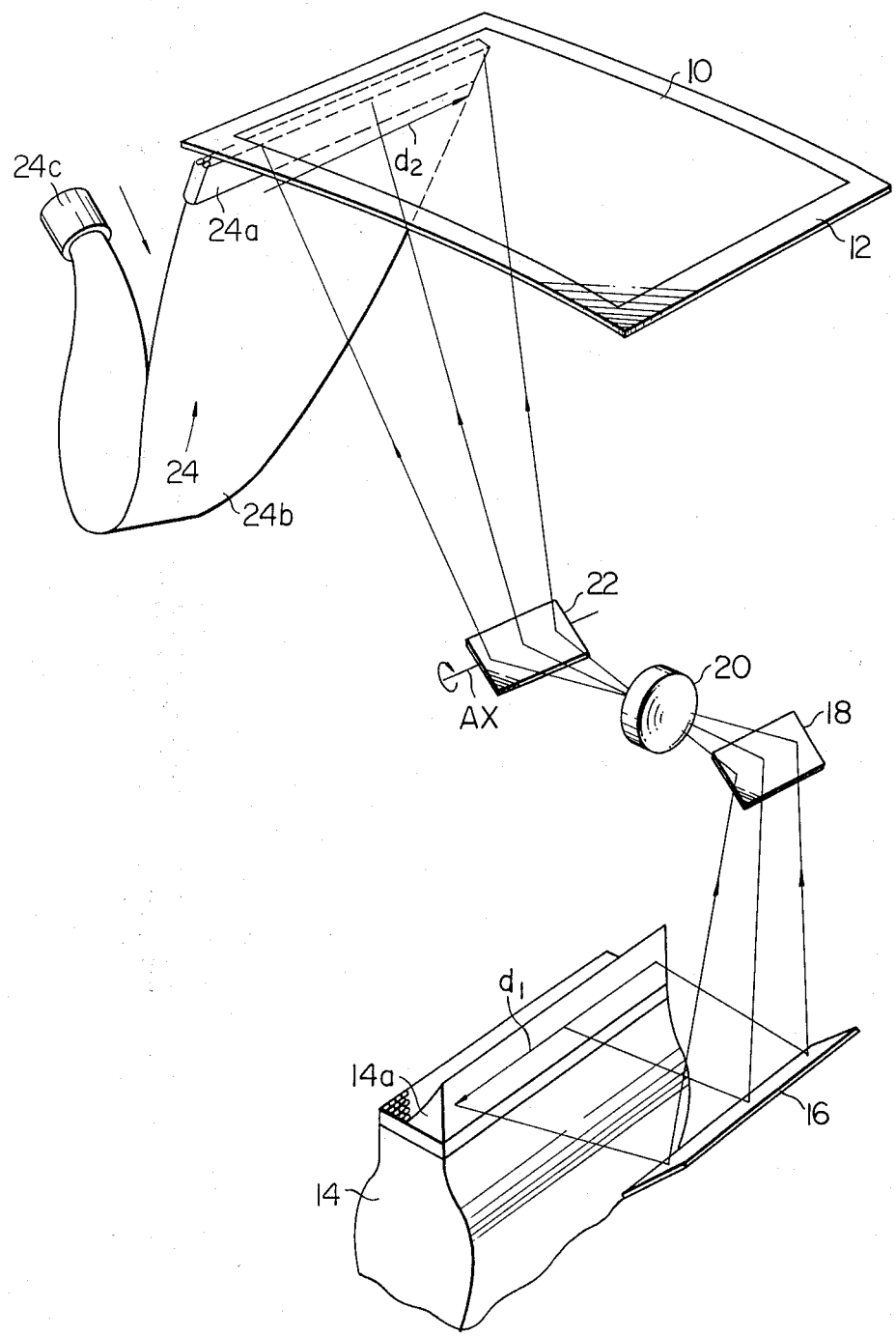
FIG. 1 is a schematic perspective view of a scanning system embodying the present invention.

Referring now to FIG. 1, a document 10 to be scanned is placed face down on a transparent platen 12. The platen 12 preferably embodies part of a cylindrical surface having an axis AX. A linear cathode ray tube 14 is provided which generates an electron beam and moves the same along a path $d_1$. The electron beam moves at constant speed along the path $d_1$ in such a manner that the movements or sweeps of the beam along the path $d_1$ occur by way of example at intervals of 1/200 sec. The sweep or trace time is 1/250 sec. and the return blanking or retrace time is 1/1000 sec. Such as cathode ray tube 14 is well known in the art and is provided in known flying spot scanners. The detailed construction of the sweep circuitry for the cathode ray tube 14, which acts as a light beam generating and sweep means, will not be described herein.

A light beam generated by the tube 14, as will be described below in detail, is reflected by a prism 14a constituting part of the tube 14 and fixed plane mirrors 16 and 18, refracted by a converging lens 20 and reflected from a rotary plane mirror 22 onto the surface of the document 10. As the electron beam sweeps along the path $d_1$, the light beam is generated, an image of which is focussed onto the surface of the document 10 and moved along a path $d_2$ which is the main scan direction of the scanning system.

An elongated pickup member 24a which constitutes part of a light receiving unit 24 is disposed closely adjacent to the path $d_2$ and the surface of the document 10 so that the light beam reflected from the surface of the document 10 is incident on the end of the pickup member 24a. The pickup member 24a comprises a plastic holder (no numeral) adapted to tightly retain the ends of optical fibres bundled together to constitute a transmission member 24b. The other ends of the optical fibres of the transmission member 24b are connected to a photoelectric unit 24c. which may include a photoelectric cell, a photomultiplier, an electical amplifier or a combination of such units with each other or with other components although the detailed circuitry of the photoelectric unit 24c is not shown since it is well known in the art.

Figure 2:
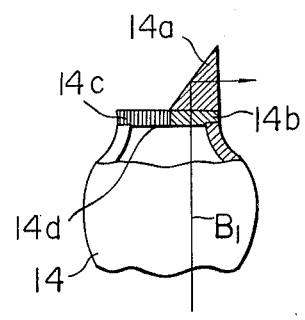
FIG. 2 is a section of a linear cathode ray tube used in the system shown in FIG. 1.

Referring now to FIG. 2, the cathode ray tube 14 is shown as comprising an electroluminescent surface 14d onto which is incident the electron beam B1 which is produced inside the tube 14. A transparent plate 14b is disposed over the surface 14b onto which is bonded the prism 14a. Incidence of the electron B1 on the surface 14d produces scintillation whereby the surface 14d emits the bright light beam mentioned above which is reflected rightward as viewed in FIG. 2 out of the tube 14 by the prism 14a. Also disposed on the surface 14d to the left of the plate 14b is a fibre optic bundle 14c which will be described in detail below. The tube 14 and lens 20 are designed to focus the light beam produced by the tube 14 onto the surface of the document 10 so as to produce a bright spot having an area of about 0.01mm² and which moves along the path $d_2$.

Figure 3:
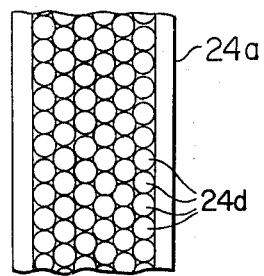
FIG. 3 is a view of the receiving surface of a receiving unit shown in FIG. 1.

Referring now to FIG. 3, the pickup member 24a is adapted to retain the ends of optical fibres 24d which constitute the transmission member 24b. Each optical fibre 24d is 0.5mm in diameter, and in the exemplary embodiment shown six rows of fibres 24d provide a fibre optic bundle having a length equal to the length of the path $d_2$ and a width of about 2–3mm.

Figure 4:
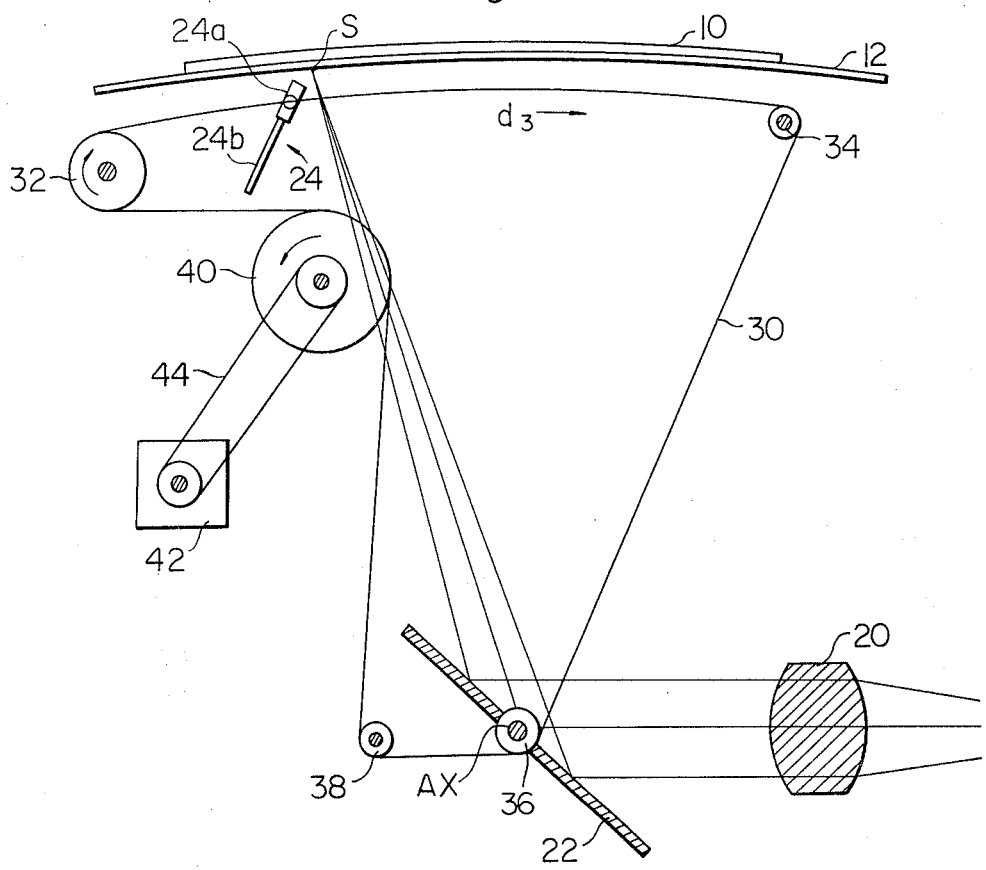
FIG. 4 is a side view of part of the system shown in FIG. 1 including drive means.

Referring now to FIG. 4, a wire, belt, chain or the like designated as 30 is trained around suitable pulleys or sprockets designated as 32, 34, 36, 38 and 40. The pulley 40 is connected by a belt 44 to a stepping motor 42 to be driven thereby as shown by an arrow. The receiving unit 24 is connected to the belt 30 to be moved thereby in a direction $d_3$, constituting the side or subscan direction which is perpendicular to the main scan direction $d_2$ at each point on the document 10. The axis of the pulley 36 is coincident with the axis AX, and the mirror 22 is connected to the pulley 36 for rotation therewith about the axis AX.

Figure 5:
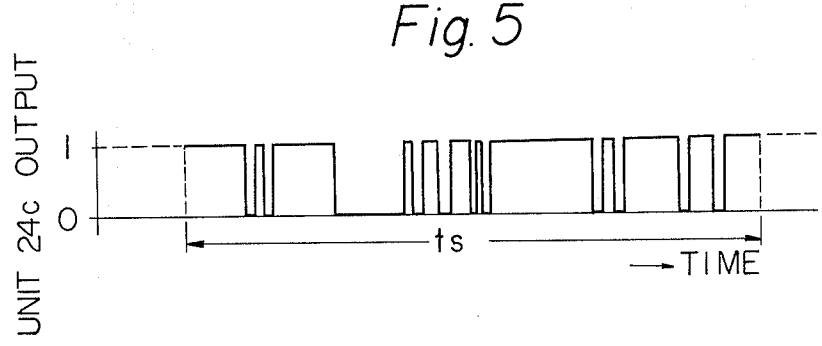
FIG. 5 is a timing chart for the system shown in FIG. 1.

In operation, the tube 14 generates the electron beam during the sweep interval designated as ts in FIG. 5 during which time the electron beam moves from one end of the path $d_1$ to the other. The moving light beam thereby produced by the tube 14 is focussed on the document 10 as described above at a spot designated as S in FIG. 4 which moves along the path $d_2$ from one end to the other. The path $d_2$ is perpendicular to the plane of FIG. 4 and passes through the spot S. The light beam is reflected from the document 10 and picked up by the pickup member 24a and fed through the transmission member 24b to the photoelectric unit 24c which generates electrical signals such as shown in FIG. 5 which will be described further below. During the retrace time of the tube 14, the stepping motor 42 is pulsed to rotate the pulley 40 counterclockwise by a small amount. This moves the belt 30 so as to move the receiving unit 24 righward by a small amount along the path $d_3$ and rotate the pulley 36 and thereby the mirror 22 by an amount such that the spot S will be moved along the path $d_3$ by the same amount as the receiving unit 24. Examination of FIG. 4 will verify that clockwise rotation of the mirror 22 will cause the spot S to move rightward along the path $d_3$. The diameters of the pulleys 40 and 36 are selected so that the spot S and receiving unit 24 will move at the same speed along the path $d_3$ or in synchronism with each other. During the next sweep of the tube 14, the electron beam will again move along the path $d_1$ so that the spot S will move along the path $d_2$ which is displaced in the direction $d_3$ by the above described amount. The stepping motor 42 is preferably pulsed so that the average speed of movement of the spot S and receiving unit 24 along the path $d_3$ is about 2.5cm/sec., which is the side of subscan speed. The operation is repeated until the entire document 10 is scanned in the manner described.

The photoelectric unit 24c is arranged to generate signals representing the information on the document 10 in a conventional manner. As shown in FIG. 5, the unit 24c may produce a high voltage output 1 in response to reflected light from a light area of the document 10 and a low voltage output 0 in response to a dark area of the document 10. This output may be fed to any desired device such as a facsimile transmitter (not shown) which may be provided with compression or other features. The facsimile transmitter produces output signals such as coded and compressed signals which are transmitted through a public telephone network to a facsimile receiver (not shown).

Figure 6:
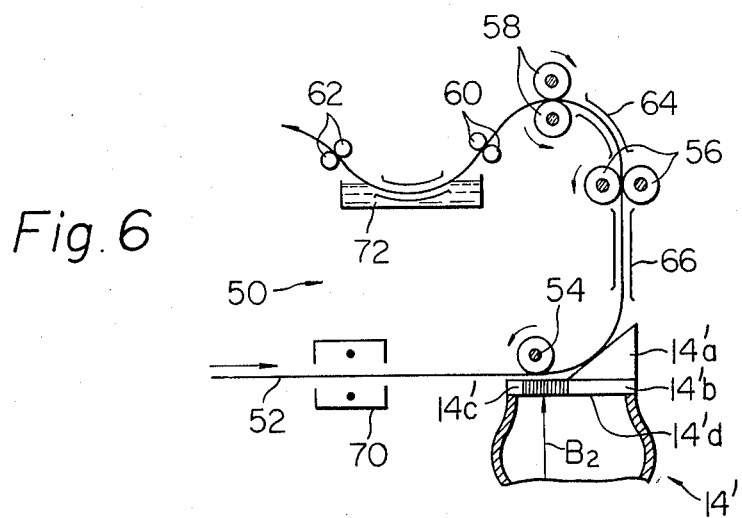
FIG. 6 is a schematic view of a receiving unit to receive the signals produced by the system of FIG. 1.

A receiving unit 50 which is incorporated by way of example into the fascimile receiver to receive the output signals of the scanning system and reproduce the document 10 in response thereto is shown in FIG. 6. A cathode ray tube 14' is provided which is identical to the tube 14 except that the signals from the scanning system are applied to the video input (not shown) thereof. A photoconductive copy sheet 52 is fed in close proximity to the fibre optic bundle 14c' by a stepping motor (not shown) synchronized with the stepping motor 42 and drive rollers 54, 56, 58, 60 and 62 in the direction shown by arrows. Guides 64 and 66 are provided for the sheet 52. The sheet 52 is fed at an average speed of 2.5 cm/sec.

The sweep circuit (not shown) of the tube 14' is synchronized with the sweep circuit of the tube 14 so that an electron beam B2 is produced by the tube 14' which is moved linearly relative to the sheet 52 in synchronism with the movement of the beam B1 in the tube 14 along the path $d_1$. It will be noted that the beam B2 is incident on the surface 14d' below the fibre optic bundle 14c' rather than the plate 14b'. The surface 14d' produces a light beam which is piped through the fibre optic bundle 14c' to the surface of the sheet 52. The light spot produced on the sheet 52 is thereby synchronized with the spot S on the document 10.

The receiving unit 50 comprises a charging unit 70 to charge the photoconductive sheet 52 prior to irradiation with the image of the document 10 by the tube 14'. The sheet 52 conducts in areas in which the light areas of the image are incident to produce an electrostatic image of the document 10 in a manner well known in electrophotography. A developing unit 72 is filled with a liquid developing solution comprising toner particles suspended in a carrier to develop the electrostatic image into a toner image. A fixing unit to fix the toner image onto the sheet 52 is conventional and is not shown.

Figure 7:
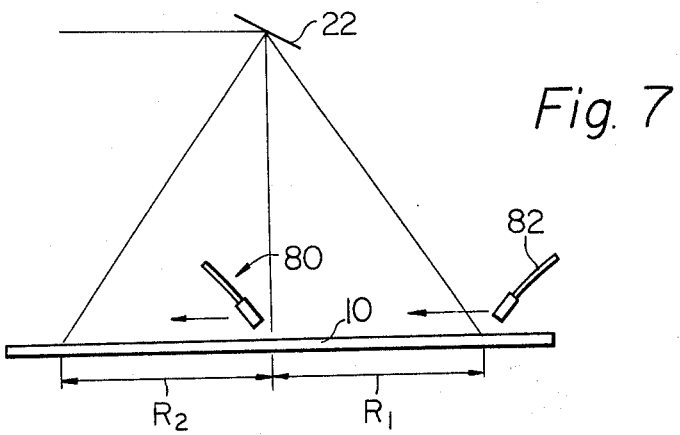
FIG. 7 is a schematic view of a modification of the system shown in FIG. 1.

Referring now to FIG. 7, in some applications it is desirable to prevent obstruction of the document 10 by the receiving unit 24 or minimize variations in the intensity of the light beam incident on the document 10 to provide two receiving units 80 and 82 identical to the unit 24 to receive light from respective areas R2 and R1 of the document 10.

Figure 8:
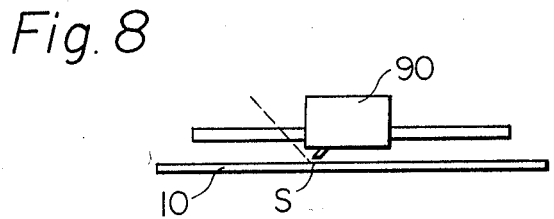
FIG. 8 is a fragmentary plan view of a modified receiver unit for the system of FIG. 1.

As shown in FIG. 8, the pickup member 24a, transmission member 24b and photoelectric member 24c may be incorporated into a unitary receiving unit 90.

Whereas the platen 12 shown in FIG. 1 is cylindrical in shape, it may be made flat if the pulley 36 is replaced by a cam so that the spots will be displaced at a uniform speed perpendicular to the main scan direction. The lens 20 may preferably be made movable in this case so that the intensity and focus of spot S is the same at all points on the document 10.

Many modifications to the scanning system will be apparent to those skilled in the art. For example, the tube 14 may be replaced by a laser (not shown) and the lens 20 omitted. In this case, a mirror (not shown) would be provided to move the light beam from the laser in the main scan direction in addition to the mirror 22 which moves the light beam in the side scan direction. The receiving unit 24 may be replaced by any operable unit known in the art which accomplishes the required function.

What is claimed is:
1. A scanning system comprising:
   fixed light beam generating means to produce a light beam and move the light beam along a first linear path;
   movable reflecting means to reflect the light beam onto a fixed surface to be scanned so that the light beam moves in a second linear path along the surface;

elongated light receiving means disposed parallel to the second linear path and closely adjacent to both the surface and the second linear path to receive the light beam reflected from the surface; and drive means to move the reflecting means to displace the light beam in a direction perpendicular to the second linear path and to move the receiving means in synchronism with the movement of the reflecting means so that the receiving means moves in said direction perpendicular to the second linear path at the same speed as the displacement of the light beam in said direction so that the receiving means is maintained closely adjacent to both the surface and the second linear path to receive the light beam reflected from the surface.

2. The system of claim 1, in which the drive means rotates the reflecting means about an axis parallel to the second linear path.

3. The sstem of claim 1, in which the reflecting means comprises a plane mirror.

4. The system of claim 1, further comprising converging lens means disposed between the beam generating means and the reflecting means to focus the light beam onto the surface.

5. The system of claim 2, in which the surface is cylindrical and the axis thereof is coincident with the axis about which the reflecting means rotates.

6. The system of claim 1, in which the beam generating means comprises a linear cathode ray tube.

7. The system of claim 1, in which the light receiving means comprises a fibre optic bundle.

8. The sytem of claim 1, in which the light receiving means comprises a photoelectric generator.

9. The system of claim 4, further comprising fixed reflecting means disposed between the beam generating means and the converging lens means.

* * * * *